United States Patent [19]

Perahia

[11] 3,940,636
[45] Feb. 24, 1976

[54] ACOUSTIC DELAY SURFACE WAVE MOTION TRANSDUCER SYSTEMS WITH ENHANCED STABILITY

[75] Inventor: Avraham Perahia, Sharon, Mass.

[73] Assignee: Sperry Rand Corporation, New York, N.Y.

[22] Filed: Mar. 3, 1975

[21] Appl. No.: 554,854

[52] U.S. Cl.............. 310/8.1; 73/517 R; 310/8.4; 310/8.5; 310/9.8; 333/30 R
[51] Int. Cl. ............................................ H01l 41/08
[58] Field of Search .............. 310/8.1, 8.5, 9.1, 9.7, 310/9.8, 8.4; 333/30 R; 73/88.5 R, 88.5 SD, DIG. 4, 517 R, 517 A, 517 AV

[56] References Cited
UNITED STATES PATENTS

| | | | |
|---|---|---|---|
| 3,848,144 | 11/1974 | Schissler | 310/9.8 X |
| 3,858,064 | 12/1974 | Schissler | 310/9.8 X |
| 3,878,477 | 4/1975 | Dias et al. | 310/8.5 X |
| 3,888,115 | 6/1975 | Schwartz | 310/9.8 X |

*Primary Examiner*—Mark O. Budd
*Attorney, Agent, or Firm*—Howard P. Terry

[57] ABSTRACT

Transducer devices employing relative changes in the acoustical propagation characteristics of surface waves traveling on opposite surfaces of a thin elastic cantilever beam yield a measure of the degree of flexing or surface strain of the elastic member. A multiplexed phase comparison loop and signal processing circuit alternately cooperates with the opposite surface waves of the transducer to supply a digital output proportional to strain and relatively free of drift, mode locking, and other spurious interactions.

10 Claims, 2 Drawing Figures

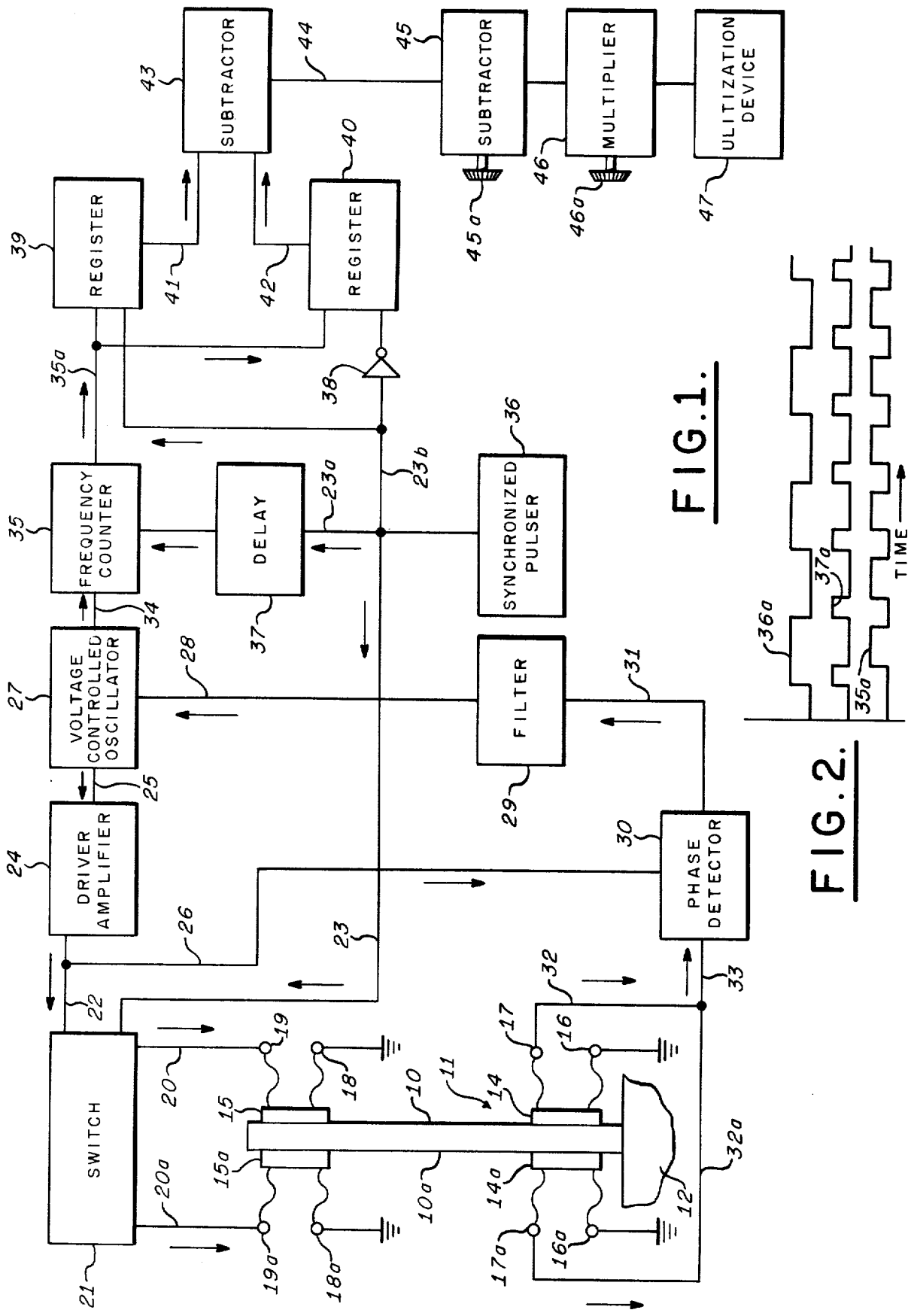

ACOUSTIC DELAY SURFACE WAVE MOTION TRANSDUCER SYSTEMS WITH ENHANCED STABILITY

BACKGROUND OF THE INVENTION

1. Field of the Invention

The invention pertains to sonic transducer devices employing surface acoustic waves adapted for use in the measurement of strain, displacement, acceleration, force or related parameters and more particularly relates to transducers utilizing relative changes of the velocity of propagation of acoustic surface waves and of the effective length of flexible elements constituted of materials, for example, of the piezoelectric or ferroelectric kinds.

2. Description of the Prior Art

Generally, prior art accelerometer and other displacement or strain sensing devices encompass a variety of structures and principles. Each approach has been found to have its particular merits; but many defects are also present, such as lack of sensitivity and reliability on the one hand, and fragility and high cost on the other. Some accelerometer arrangements, for example, require expensive auxiliary equipment, such as feed back mechanisms for providing reliable calibration or constant temperature enclosures. Many such prior art arrangements are inherently analog in nature and do not lend themselves directly to use in digital equipment.

The prior art includes a variety of piezoresistor transducers, including direct stress transducers of the kind employing a flexible cantilever clamped at one end to which acceleration or physically applied forces are directed at the unclamped end for flexing the cantilever. In these transducers, the basic structural member (the cantilever) often does not contribute greatly to the sensitivity of the apparatus, merely transmitting the stress to be measured to a more sensitive sensor element such as a piezoresistor affixed to a flexing surface of the cantilever. Measurement of current flow through such resistors yields a measure of strain of the cantilever.

Such devices are, however, expensive and difficult to manufacture and strict controls must be exercised to yield a uniform product. In particular, reliable bonding of the strain gauge to the cantilever is difficult. Since resistivity of an exposed resistor element is to be measured by measuring flow of electrical current through it, the devices are sensitive to changing ambient temperature and humidity conditions. Strict maintenance of calibration requires many special precautions. Furthermore, the devices are inherently analog in nature and are best suited for application when the associated display or other utilization device is an analog device. Such measurement devices generally demonstrate troublesome zero drift and scale factor drift with variations in temperature and in power supply voltage and may therefore demonstrate significant warm up drifts and even continued instability after the initial operating period.

SUMMARY OF THE INVENTION

The present invention relates to strain, motion, force or acceleration transducing devices employing surface propagating acoustic waves on flexible elements. Measurements are made of the relative changes in the time of propagation of the surface sonic waves as the flexible element is displaced by the force to be measured. The present invention provides a novel signal processing system for improving the operation and precision of surface wave transducers by making them more fully independent of the spurious effects of undesired signal coupling between oscillatory channels of the transducer systems. More particularly, the invention employs a single multiplexed phase comparison loop cooperating with a digital signal processing circuit for yielding a digital output reliably free of significant drift effects.

BRIEF DESCRIPTION OF THE DRAWINGS

FIG. 1 is an illustration showing a surface wave transducer in elevation view connected to the novel driving and signal processing circuit of the present invention.

FIG. 2 presents wave form graphs useful in explaining the operation of the invention.

DESCRIPTION OF THE PREFERRED EMBODIMENTS

The motion transducer employed in the novel instrument of the present invention is preferably similar to the motion transducer of FIGS. 1 through 4 of the U.S. Pat. No. 3,858,064 for "Stable Acoustic Delay Surface Wave Motion Transducer Systems," issued Dec. 31, 1974 in the name of Lloyd R. Schissler and assigned to Sperry Rand Corporation. For convenience in explaining the present invention, the same reference numerals are used with respect to the motion transducer in FIG. 1 of the present case as are found in FIGS. 1 and 2 of the aforementioned Schissler patent. Reference may also be had to the basic U.S. Pat. application Ser. No. 300,034 for "Acoustic Delay Surface Wave Motion Transducers," filed Oct. 24, 1974 in the names of H. B. Matthews, H. van de Vaart, and J. C. Worley and assigned to Sperry Rand Corporation issued Feb. 4, 1975 as patent 3,863,497. Such acoustic surface wave motion transducers utilize changes in the propagation characteristics of acoustic waves flowing at a surface of a relatively thin flexure member to provide output signals yielding measures of the degree of flexing of the flexure member. Accordingly, the transducer may be used to detect relative motion between parts of the flexing member, whether induced by direct acceleration of parts of the flexible member itself, or whether induced by directly communicated mechanical forces, as in conventional strain gauges or other such transducer devices.

As is seen in FIG. 1, the transducer element employs propagation of a surface elastic wave at a predetermined boundary surface 10 of an elastic cantilever or flexure member 11. The flexure device 11 is clamped in a conventional manner within a base element 12. Cantilever 11 preferably has a thin cross section of elongate or rectangular shape, thus affording a preferred flexure direction with little sensitivity to forces applied at right angles to the thin dimension. Depending upon the selected design acceleration when operated as an accelerometer, for instance, the cantilever 11 may have a seismic mass clamped at its end opposite base 12.

Waves of the Rayleigh type are used in which the particle motion at the boundary surface 10 is miniscule and retrograde elliptical so that components of particle displacement exist both in the direction of energy propagation and normal to the boundary surface plane. The surface acoustic wave velocity is slightly less than the ordinary bulk elastic wave velocity often employed in prior art elastic transducer devices. The acoustic energy of the preferred wave flows almost entirely within a thin layer at surface 10 and is closely bound to that surface with a propagation velocity preferably substantially independent of the carrier frequency of the wave.

The surface acoustic wave is accompanied by propagating synchronous alternating traveling electric and magnetic fields which extend somewhat into free space above the boundary surface 10. Quartz, piezoelectric semiconductors, and ferroelectric materials, as well as other materials, demonstrate such surface wave propagation. Excitation of the running surface acoustic wave may be accomplished by generating a compatible running electric field wave at the surface boundary of the medium on which the surface waves are to propagate. Similarly, for magnetostrictive materials, the surface acoustic wave may be excited by presenting a time varying magnetic field at the boundary surface. Various methods of generation of such surface waves are described in the aforementioned patents and in other literature. The same principles as are employed for exciting the waves may generally be used to reconvert the waves into electrical signals for measurement purposes.

In FIG. 1, element 15 is a conventional wave exciter for exciting acoustic surface waves, causing them to flow along the surface or boundary layer 10 of the transducer. An electrical driving signal applied to the flexible lead terminals 18, 19 is converted by exciter 15 into Rayleigh waves which may be collected by receiver element 14, wherein the acoustic signals are reconverted to electrical signals appearing at the flexible lead output terminals 16, 17. It will readily be seen by those with average skill in the art that the functions of exciter 15 and receiver 14 may be interchanged as a matter of design choice.

It will be seen that, if the top of cantilever 11 is moved to the left in FIG. 1, the distance between exciter 15 and receiver 14 is increased; therefore, an increased time may be taken for the acoustic signal to flow between elements 15 and 14. Conversely, if the top of cantilever 11 of FIG. 1 is moved to the right, surface 10 of the cantilever is compressed and the distance between exciter 15 and receiver 14 is diminished. In this circumstance, the acoustic signal arrives at receiver 14 in a shorter time than in the previous situation. On the other hand, the surface wave propagation velocity in some of the usable cantilever materials changes upon flexure of the cantilever, so that the actual delay may either increase or decrease with strain. In any event, an alternating motion of the free end of flexure element 11 produces a signal delay at output terminals 16, 17 that is modulated in time in proportion to the displacement amplitude of cantilever 11. It will be seen that a measure of the deflection of cantilever 11 may be made in several ways, as is taught in the aforementioned U.S. Pat. No. 3,858,064.

In the form of the transducer generally preferred, an arrangement is devised of surface wave systems in a combination inherently immune to changing ambient temperature conditions when operated with appropriate signal processing circuits. Paired surface wave paths 10, 10a are now formed as seen in FIG. 1 on opposed sides of the flexure cantilever 11, surface path 10 being associated with exciter 15 and receiver 14 and surface path 10a with exciter 15a and receiver 14a. It will be seen that movement to the left of the top of cantilever 11 causes surface 10 to stretch, while surface 10a is compressed by a substantially equal amount, and vice versa. If the temperature of cantilever 11 changes, the respective at-rest distances or transit times between elements 14, 15 and 14a, 15a change substantially equally. If a signal processing circuit is used in which the effective total delays are subtracted one from the other, spurious delays induced by temperature change are substantially cancelled, as has been shown in the prior art.

While several types of surface wave exciters and receivers are available in the prior art, one arrangement which may be used is illustrated in FIG. 3 of the aforementioned U.S. Pat. No. 3,858,064, where the exciter device 15 consists of a pair of electrodes with respective interdigital fingers of alternating instantaneous electrical polarity. Standard photoetching and photoresist masking or other techniques are used to fabricate the thin conductors of the interdigital electrodes of aluminum or other electrically conducting material, and the conductor may have widths of the order of microns depending upon the design frequency. Adjacent pairs of fingers of any one interdigital electrode are spaced substantially one wave length apart at the operating carrier frequency. The electrode pairs act in a manner analogous to an end fire radio antenna array, propagating the desired forward surface wave in the direction of the analogous receiver 14 when driven by signals passing through a conventional matching network from a conventional source of electrical current oscillations.

The interdigital electrodes of exciter element 15 may be connected to cooperating circuits at terminals 18, 19 by fine gold wires respectively fastened to the electrode pairs by standard thermocompression techniques, for example. Similarly, the interdigital electrodes of the analogous receiver element 14 may likewise be connected to cooperating circuits at terminals 16, 17 by fine gold wires or by other equivalent means.

In operation, the exciter electrode system 15 of FIG. 1 interacts with the quartz, lithium niobate, bismuth germanate, or lithium germanate substrate that forms the cantilever flexure element 11, producing a propagating surface acoustic wave flowing toward receiver 14. The traveling wave is successively amplified as it passes under each pair of adjacent electrode fingers. The receiver electrode system 14 is similarly constituted and readily operates in the reverse sense to reconvert the acoustic wave into a delayed electrical output signal at terminal 17. In both cases, it is preferred in the interest of efficiency to space the electrode fingers so that the condition of acoustic synchronism obtains, the traveling electric field at exciter 15, for example, having the same periodicity as the electric field normally bound to the acoustic wave. It will readily be appreciated that elements associated with surface 10a operate in a manner similar to the operation of elements associated with surface 10, exciter 15a when supplied with driving signals at terminal 19a producing a surface acoustic wave propagating along surface 10a to be converted into electrical signals upon arrival there by receiver 14a for supplying at terminal 17a to cooperating utilization circuits.

In the present invention, the sine wave electrical carrier signal for the alternate excitation of surface waves in surface boundaries 10, 10a of cantilever 11 is provided by a conventional voltage-controlled oscillator 27 coupled by lead 25 to a conventional driver amplifier 24 whose output is coupled, in turn, via lead 22 to an electronically controllable switch 21. Switch 21 is controlled by a pulse train 36a (FIG. 2) from the system pulse synchronizer 36 which may be a free running multivibrator. Switch 21, as controlled by the square pulse train 36a applied via lead 23, cyclically and alternately applies equal time duration carrier trains via leads 20 and 20a to the respective terminals 19, 19a of acoustic wave exciters 15, 15a. For example, when the base 12 is not accelerating, a train of carrier cycles of predetermined time duration and number of cycles is first coupled to exciter 15 and then to exciter 15a and the process is continuously and cyclically repeated. In any event, the alternately received trains of carrier cycles are converted by the respective receivers 14, 14a to electrical signals of the same carrier frequency or frequencies and appear on leads 32, 32a connected in common by lead 33 to a first input of a conventional phase detector 30. The second input of the phase detector 30 is supplied by lead 26 with the output of voltage-controlled oscillator 27 as a phase reference. Phase detector 30 then supplies on lead 31 as unidirectional output signal of amplitude related to the instantaneous relative phases of the carrier signals on leads 26, 33 when indicating actual acceleration of base 12. The finite output of phase detector 30 is then supplied through filter or integrator 29 via lead 28 for cyclic voltage control or readjustment of the output frequency of oscillator 27 thus closing the phase locked control loop.

In the design of the described phase control loop, it is assumed that the delay characteristics of surfaces 10, 10a of cantilever 11 and of the associated exciters 15, 15a and receivers 14, 14a are substantially independent of temperature changes and of other drifts or, more important, that any drifts characterizing the transducer 11 and its surface wave paths 10 and 10a are relatively long time drifts as compared to the time between successive operations of switch 21. The only remaining element which may exhibit a drift problem is switch 21 which may be characterized by different drifts in its two output paths; however, switches having a low order of said differential drift are readily selectable from those available on the market. The drifts appearing in the circuit including phase detector 30, filter or integrator 29, oscillator 27, and driver amplifier 24 have no significant effect, since these circuit elements are operated on a time multiplexed basis by virtue of the action of switch 21. It will be appreciated that driver amplifier 24 may be arranged to drive exciters 15, 15a directly, and that the multiplexing operation of switch 21 may then be achieved by connecting its two input arms or ports to leads 32, 32a and its single output port to lead 33 for supply to phase detector 30. Two multiplex switches, one each at each end of transducer 11, may simultaneously be used, both being operated synchronously under control of pulser 36.

In the system of FIG. 1, and according to the present invention, the loop controlling oscillator 27 includes a filter circuit 29 which may, in practice, be provided with an internal amplifier if gain is required and the filter may control loop amplification and frequency shaping as conventionally supplied in similar phase locked loops. Operation may be generally in the manner achieved with the circuit of FIG. 7 of U.S. Pat. No. 3,858,064; in the present FIG. 1, the output of phase detector 30 is coupled by lead 31 to filter 29 which may function to provide one or more successive integrations, required since a change in frequency of the oscillatory loop leads only to a measure of a change in phase at the output of phase detector 30.

Accordingly, it is seen that in an ideal situation and with no motion of the base 12 of the motion transducer, the output signal on lead 25 provided by oscillator 27 will have a constant frequency over successive switching cycles. When the base 12 is being constantly accelerated, the carrier output of voltage controlled oscillator 27 will shift in equal successive alternating time periods, the differential frequency and its sense being a measure of the magnitude and sense of the acceleration of base 12. Any such differential value is readily detected by frequency counter 35 when the output of oscillator 27 appearing on lead 34 is supplied to counter 35. Counter 35 is also controlled by the synchronizer pulser 36 whose output square wave 36a is coupled via lead 23a to a delay circuit 37 in the form of a conventional one-shot delay circuit whose output is like pulse wave 37a of FIG. 2. The positive excursions of pulse wave train 37a begin synchronously with the positive excursions of pulse wave train 36a.

Wave 37a is coupled to an input port of frequency counter 35, which counter may be a conventional frequency counter, the count period shown as graph 35a being triggered in a conventional way by the successive trailing edges of the pulses of pulse train 37a. Since the start of the counting period of frequency counter 35 is slightly delayed according to graph 35a with respect to alternate operations of switch 21, the phase locked loop including voltage controlled oscillator 27 is permitted to stabilize its operation so that the output of oscillator 27 reliably becomes steady before counter 35 makes each successive measurement. Thus, successive periods in which the frequency of oscillator 35 is shifting in a transient manner are not included in the final count, the successive counting events occurring only after oscillations of oscillator 27 have stabilized in the interest of accurate acceleration measurement.

Each successive selected count corresponding to the condition of surface wave path 10 will be stored via lead 35a in a first conventional register 39. Likewise, each successive selected count corresponding to the condition of surface wave path 10a will be stored via lead 35a in a second conventional register 40. Operation of registers 39 and 40 is synchronized in a conventional manner with respect to wave 36a coupled by lead 23b into each of the registers. Wave 36a is coupled directly to control the operation of register 39, but is coupled through diode 38 before supply to register 40. The output of counter 35 is loaded into register 39 by the synchronizer wave 36a for the count on one side of cantilever 11, while it is loaded into register 40 by the inverted wave 36a for the next succeeding count on the second side of cantilever 11. The counts are respectively shifted to subtractor 43 via leads 41, 42 where the count difference is yielded, a count proportional to the instantaneous acceleration of base 12. Any zero off-set characterizing a particular transducer 11 may be removed by manual or other insertion of a corrective bias via control 45a into subtractor 45. If the scale factor of the output signal on lead 44 requires adjustment, multiplier 46 may be set by manual or other control 46a to the appropriate value to yield a truly proportional acceleration signal for operation of the display or other utilization device 47.

It is seen that the invention is a sonic transducer device and signal processing system employing surface acoustic waves that is adapted to use in the measurement of acceleration, velocity, strain, or related parameters. Relative changes in propagation velocity of Rayleigh waves alternately flowing at paired flexed surfaces may be measured in a multiplexing arrangement which is compact, light, accurate, and reliable. Furthermore, the system reduces to a minimum circuit components which are the source of undesired signal drift in prior art systems that compare times of transit along paired paths. The multiplexed transducer system demonstrates little zero or scale factor drift, or sensitivity to temperature, humidity, or power supply variations, as well as providing maximum freedom from prior art defects including freedom from mode locking and other spurious coupling effects found disadvantageous in certain applications. The novel transducer system may be used to measure acceleration or as a strain or displacement gauge and, since it provides a frequency or digital output it minimize noise and drift problems inherent in purely analog devices and is relatively easily interfaced with digital signal utilization equipment. It will be understood that a further form of the invention may be envisioned employing more than one cantilever beam, each being placed to monitor a particular geometrical axis. Of particular interest is the case in which three cantilever beams are placed in mutually orthogonal relation so as to provide acceleration data with respect to three output axes. The synchronized pulser may be replaced with a word generator and switch 21 is replaced with a switch having a layer plurality of positions. Each two consecutive readings from the two surfaces associated with a particular cantilever are treated as discussed in connection with the apparatus of FIG. 1.

While the invention has been described in its preferred embodiments, it is to be understood that the words which have been used are words of description rather than of limitation and that changes may be made within the purview of the appended claims without departing from the true scope and spirit of the invention in its broader aspects.

I claim:
1. Transducer means comprising:
   flexure means having first and second opposed flexible surface layer means for separately propagating respective first and second acoustic waves along first and second respective predetermined paths therein,
   first and second exciter means including switch means for alternately exciting and propagating said respective first and second acoustic waves along said first and second respective predetermined paths in response to respective alternate first and second exciter electric signals,
   first and second receiver means along said respective first and second predetermined paths for alternately receiving and converting said respective first and second acoustic waves into respective first and second successive receiver electric signals,
   voltage controllable oscillator means for alternately driving said first and second exciter means through said switch means,
   phase detector means responsive to said voltage controllable oscillator means and alternately responsive to said first and second receiver means,
   filter means responsive to said phase detector means for supply of a control voltage to said voltage controllable oscillator means, and
   signal processor means responsive to said voltage controllable oscillator means for deriving a measure of the flexure of said flexure means for supply to utilization means.

2. Apparatus as described in claim 1 wherein said switch means comprises an electronically controllable switch having an input port supplied by said voltage controllable oscillator means and respective first and second output ports coupled alternately to said first and second exciter means.

3. Apparatus as described in claim 2 wherein said first and second paths are so characterized, when said flexure means is flexed, that said respective first and second successive receiver electric signals differ in frequency in proportion to the degree of flexure of said flexure means.

4. Apparatus as described in claim 3 wherein said filter means comprises integrator means.

5. Apparatus as described in claim 4 wherein said switch means operates cyclically for excitation of said first and second exciter means for equal successive time intervals under control of synchronizer means.

6. Apparatus as described in claim 5 wherein said signal processor means includes counter means responsive to said voltage controllable oscillator means and to said synchronizer means.

7. Apparatus as described in claim 6 wherein said synchronizer means operates delay means for the delayed operation of said counter means with respect to the timing of said synchronizer pulses for the elimination of spurious counts during the transient period at switching of said switch means.

8. Apparatus as described in claim 7 wherein said signal processor means includes first and second shift register means responsive to said synchronizer means for transfer into said respective first and second shift register means of counts from said counter means representing the instantaneous respective first and second successive receiver electric signal frequencies into subtractor means.

9. Apparatus as described in claim 8 wherein said signal processor means additionally includes zero offset adjustment means responsive to said subtractor means.

10. Apparatus as described in claim 9 wherein said signal processor means additionally includes scale factor error adjustment means responsive to said subtractor means.

* * * * *